United States Patent
Bruemmer et al.

(10) Patent No.: US 9,552,503 B2
(45) Date of Patent: Jan. 24, 2017

(54) DISTRIBUTED POSITIONING AND COLLABORATIVE BEHAVIOR DETERMINATION

(71) Applicant: 5D Robotics, Inc., Carlsbad, CA (US)

(72) Inventors: David J. Bruemmer, Carlsbad, CA (US); Benjamin C. Hardin, Vista, CA (US); Curtis W. Nielsen, Carlsbad, CA (US)

(73) Assignee: 5D Robotics, Inc., Carlsbad, CA (US)

( * ) Notice: Subject to any disclaimer, the term of this patent is extended or adjusted under 35 U.S.C. 154(b) by 335 days.

(21) Appl. No.: 13/873,631

(22) Filed: Apr. 30, 2013

(65) Prior Publication Data

US 2014/0035725 A1 Feb. 6, 2014

Related U.S. Application Data

(60) Provisional application No. 61/641,201, filed on May 1, 2012, provisional application No. 61/652,347, filed (Continued)

(51) Int. Cl.
*G08B 5/22* (2006.01)
*G08B 25/00* (2006.01)
(Continued)

(52) U.S. Cl.
CPC ........... *G06K 7/10306* (2013.01); *G01C 21/00* (2013.01); *G05D 1/0291* (2013.01); *G05D 1/024* (2013.01);
(Continued)

(58) Field of Classification Search
CPC ...... G01C 21/00; G05D 1/0291; G05D 1/024; G05D 1/0261; G05D 1/0274; G05D 1/0278; G05D 2201/0213; G06K 7/10306
See application file for complete search history.

(56) References Cited

U.S. PATENT DOCUMENTS 6,043,757 A * 3/2000 Patrick ................. G08G 5/0095
340/945
6,300,903 B1 * 10/2001 Richards ................. G01S 13/42
342/357.59
(Continued)

FOREIGN PATENT DOCUMENTS

| EP | 2169503 A2 | 3/2010 |
|---|---|---|
| WO | 2004/015369 A2 | 2/2004 |
| WO | 2008/005663 A2 | 1/2008 |

OTHER PUBLICATIONS

International Search Report and Written Opinion of the International Searching Authority; Jul. 16, 2013; PCT/US13/38987.

*Primary Examiner* — Quang D Pham
(74) *Attorney, Agent, or Firm* — Martensen IP

(57) ABSTRACT

A system and its associated methodology for distributed positioning and collaborative behavioral determination among a group of objects, interactive tags associated with each of a plurality of objects provide to each object relative positional data and state information regarding the other nearby objects. Using this information, each object develops a spatial awareness of its environment, including the position and action of nearby objects so as to, when necessary, modify its behavior to more effectively achieve an objective.

20 Claims, 9 Drawing Sheets

Related U.S. Application Data on May 29, 2012, provisional application No. 61/773,063, filed on Mar. 5, 2013.

(51) Int. Cl.
  *G06K 7/10* (2006.01)
  *G01C 21/00* (2006.01)
  *G05D 1/02* (2006.01)

(52) U.S. Cl.
  CPC .......... *G05D 1/0261* (2013.01); *G05D 1/0274* (2013.01); *G05D 1/0278* (2013.01); *G05D 2201/0213* (2013.01)

(56) References Cited

U.S. PATENT DOCUMENTS

| | | | |
|---|---|---|---|
| 7,525,425 B2* | 4/2009 | Diem | 340/539.13 |
| 7,710,322 B1* | 5/2010 | Ameti et al. | 342/465 |
| 8,159,329 B1* | 4/2012 | Killian et al. | 340/8.1 |
| 8,200,428 B2* | 6/2012 | Anderson | 701/453 |
| 2003/0191568 A1 | 10/2003 | Breed et al. | |
| 2003/0233210 A1* | 12/2003 | Liberti, Jr. | G01S 5/0215 |
| | | | 702/150 |
| 2004/0099736 A1* | 5/2004 | Neumark | G01S 5/04 |
| | | | 235/385 |
| 2005/0060069 A1 | 3/2005 | Breed et al. | |
| 2005/0113987 A1* | 5/2005 | Fink | G05D 1/0038 |
| | | | 701/21 |
| 2007/0040743 A1* | 2/2007 | Brettschneider | G01S 5/0226 |
| | | | 342/463 |
| 2008/0009970 A1* | 1/2008 | Bruemmer | 700/245 |
| 2008/0027599 A1* | 1/2008 | Logan | G05D 1/0234 |
| | | | 701/23 |
| 2009/0326713 A1* | 12/2009 | Moriya | A63H 17/00 |
| | | | 700/255 |
| 2010/0127853 A1* | 5/2010 | Hanson | G01S 5/0289 |
| | | | 340/539.13 |
| 2010/0198512 A1 | 8/2010 | Zhang et al. | |
| 2010/0198513 A1* | 8/2010 | Zeng et al. | 701/300 |
| 2010/0324771 A1* | 12/2010 | Yabushita | G05D 1/024 |
| | | | 701/25 |
| 2011/0046781 A1 | 2/2011 | Summer | |
| 2011/0153117 A1* | 6/2011 | Koch | E02F 9/2054 |
| | | | 701/2 |
| 2011/0246015 A1* | 10/2011 | Cummings | G06F 3/04815 |
| | | | 701/23 |
| 2012/0025964 A1* | 2/2012 | Beggs et al. | 340/435 |
| 2012/0092208 A1* | 4/2012 | LeMire | G01S 13/87 |
| | | | 342/29 |
| 2013/0261949 A1* | 10/2013 | Eriksson | G05D 1/104 |
| | | | 701/300 |
| 2015/0105906 A1* | 4/2015 | Ueda | G05D 1/024 |
| | | | 700/255 |

\* cited by examiner

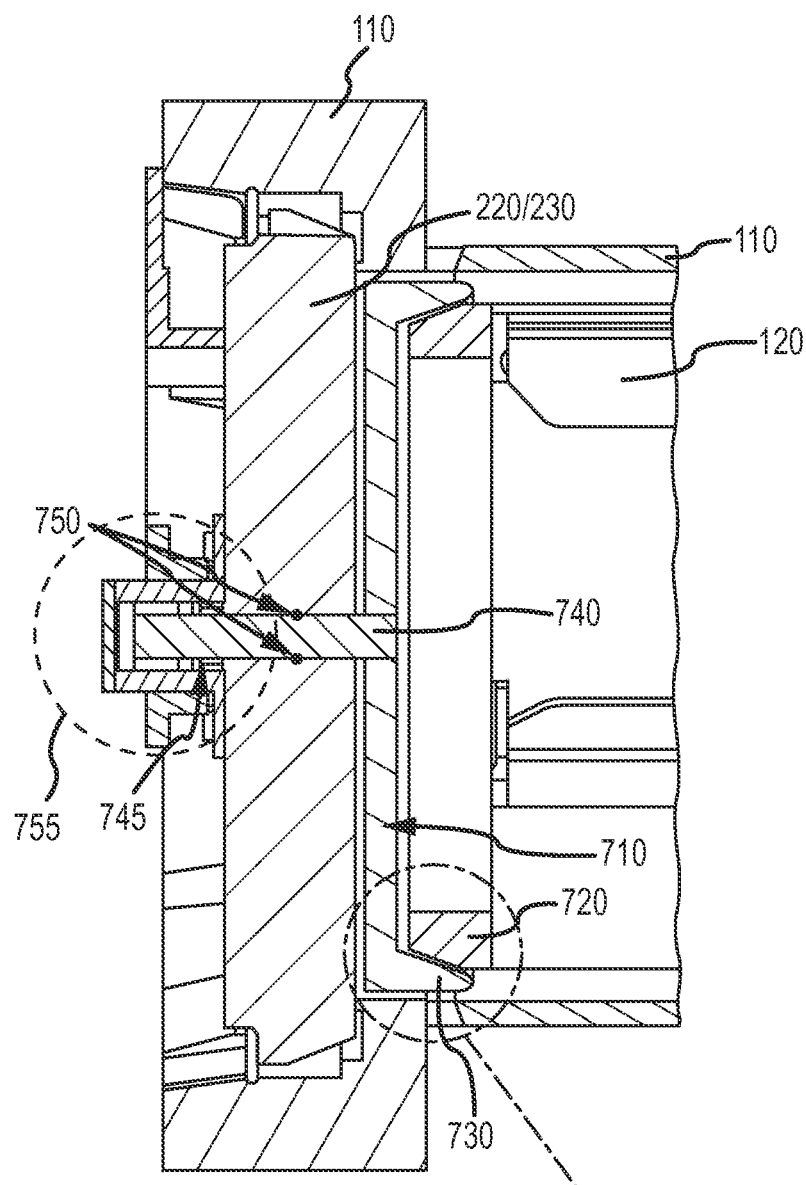
FIG.7
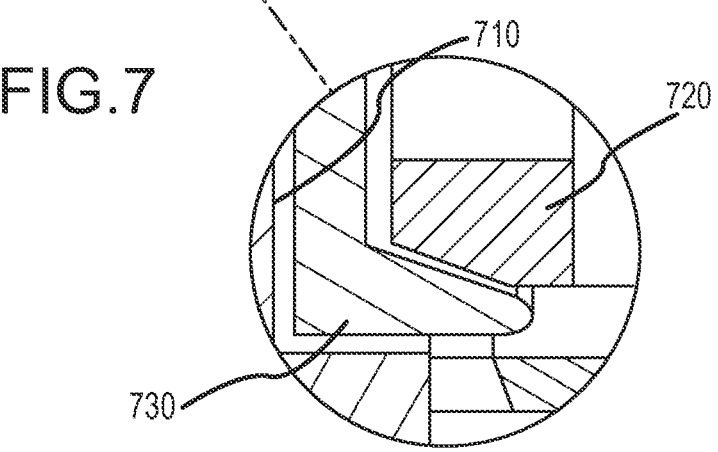

DISTRIBUTED POSITIONING AND COLLABORATIVE BEHAVIOR DETERMINATION

RELATED APPLICATION

The present application relates to and claims the benefit of priority to U.S. Provisional Patent Application No. 61/641,201 filed 1 May 2012, U.S. Provisional Patent Application No. 61/652,347 filed 29 May 2012, and U.S. Provisional Patent Application No. 61/773,063 filed 5 Mar. 2013, all of which are hereby incorporated by reference in their entirety for all purposes as if fully set forth herein.

BACKGROUND OF THE INVENTION

Field of the Invention

Embodiments of the present invention relate, in general, to determining the relative position of an object and, more particularly, to collaborative positioning and behavior determination using, among other things, active range determination resources.

Relevant Background

Sensor fusion is the combining of sensory data or data derived from sensory data from disparate sources such that the resulting information is, in some sense, better than would be possible when these sources were used individually. By comparison, data fusion is the process of integration of multiple data and knowledge representing the same object into a consistent, accurate, and useful representation. In each case, the overall goal is to provide more accurate, more complete, or more dependable/reliable result.

The data sources for a fusion process are not specified to originate from identical sensors. Indeed, one could argue that disparate data sources related to the same goal may provide a more accurate and more reliable product. While the fusion of multiple sensory data so as to provide "better" data is admirable, better data by itself is often inadequate. This is particularly true with respect to the behavioral use of spatial or positional data.

Understanding one's precise location has been a long quest throughout history. By possessing positional knowledge combined with an accurate map, one would think that many of the challenges from getting from point A to B would be resolved. Yet despite the ubiquitous nature of GPS systems, people continue to get lost, traffic jams continue to occur and collisions remain a threat. Indeed, one might argue that such systems have made the problems worse. Lacking in the prior art is a fusion of disparate positional determinative resources that provides a user with not only spatial but also relational information that can form the basis for a behavioral modification. Particularly lacking is a means to gain the ideal benefits of both absolute and relative positioning at the same time by appropriately combining multiple positioning techniques.

GPS is an example of absolute positioning and provides the benefit of supporting path planing, facilitating communication about positioning over large distances, and providing a persistent understanding of where things are in the world. Relative positioning has the benefit of being robust, more precise and does not require connection to an external source (i.e. satellite). Prior teachings have not provided a means to gain the benefits of both approaches simultaneously. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Presented hereafter by way of example is a system and its associated methodology for distributed positioning and collaborative behavioral determination among a group of objects. In one embodiment of the invention, interactive tags are associated with each of a plurality of objects that provide to each tag relative positional data and state information regarding the other nearby objects. Using this information, each object develops a spatial awareness of the nearest neighbors in the environment, including the positional and action of nearby objects so as to, when necessary, modify its behavior to more effectively achieve an objective.

One method embodiment for distributed positioning and collaborative behavior determination by an object begins by identifying a presence of one or more nearby objects and, thereafter, determining a relational location of each of the one or more nearby objects. The means by which to develop such a relational location is, according to one embodiment, dependent on the presence of sensing infrastructure such as positioning or detection modules placed at known locations.

In an embodiment in which infrastructure exists, positioning or detection modules are embedded into the environment and each are programmed to know their own geospatial location based on, for example a GPS position or within a map. Other nearby objects may not know their precise geospatial location. However, as long as there are position modules that do know their own location, these can be used to calculate the absolute position of the other nearby objects by reference to the known location of the position modules.

Each object at a known location (a position module or nearby module once it determines its position based on a position module) is able to measure the distance to the other nearby objects within range. Each of these objects further includes a data communication means that uses a non-line-of-sight transmission to share this distance data. According to one embodiment of the present invention, each object can then broadcast distance measurements to the other objects, including the unique identification of each object and the known position of the position modules.

Using triangulation (assuming multiple position modules), each object can thereafter compute the position of itself and the other nearby objects. By doing so, each object possesses its relative and absolute position In a scenario in which there are no infrastructure positioning resources (meaning there are no positioning modules at known locations) a peer to peer approach is used. In such an embodiment of the present invention, two (or more) tags are placed on an object such that a single object knows (or can sense) the relative location of the tags on its own body. This permits the object to calculate a relative x,y position from its own origin to all other tagged objects within range. Each object can respond reactively to the relative location of the other tags (objects) to perform follow, lead, obstacle avoidance, guarded motion, planning, object pickup, etc. . .

Each object with multiple tags can also instantly transform its own relative understanding of its local environment into an absolute position reference the instant that a surveyed (fixed) position module (which knows its absolute position) comes into view. This allows a seamless interplay between the relative peer to peer positioning for less developed areas (i.e. forests, rural environments, outdoors) and the absolute coordinate system where infrastructure is available (i.e. buildings, facilities, cities).

With the presence of other nearby objects detected, the method continues by receiving positional data including state information from each of the one or more nearby objects. The object uses this information/data in developing a spatial awareness of a local environment and in prioritizing positional data from each of the one or more nearby objects. Using these tools, an object can then modify its mission behavior based on prioritized positional data.

A system for distributed positioning and collaborative behavior determination, according to another embodiment of the present invention, can include an ultra wide band (UWB) tag operable to detect a presence of one or more nearby objects and a receiver, such that, responsive to detection of one or more nearby objects, the receiver and/or tag is operable to receive state information from each of the detected one or more nearby objects. The system can further include a spatial awareness engine operable to create an independent spatial representation of the one or more nearby objects and a prioritization engine operable to prioritize state information received from each of the one or more nearby objects. A behavior engine can then use the information provided by the prioritization engine and the spatial awareness engine, among other things, to modify mission objectives and/or coordinate activities within the group of objects to achieve a common objective.

In another embodiment for distributed positioning and collaborative behavior determination among a plurality of objects, a detection module is operable to detect the presence of one or more nearby objects and a spatial awareness engine operable to create an spatial representation of the plurality of objects and wherein the spatial representation is object centric and provides relative positional and translational information about the one or more nearby objects. As with the prior embodiment, a behavior engine can thereafter modify one or more mission objectives based on the spatial representation of the plurality of objects.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 7 is another object centric relational representation of a plurality of nearby objects shown in FIGS. 5 and 6 showing one embodiment of behavior modification according to one embodiment of the present invention;

Figure 1:
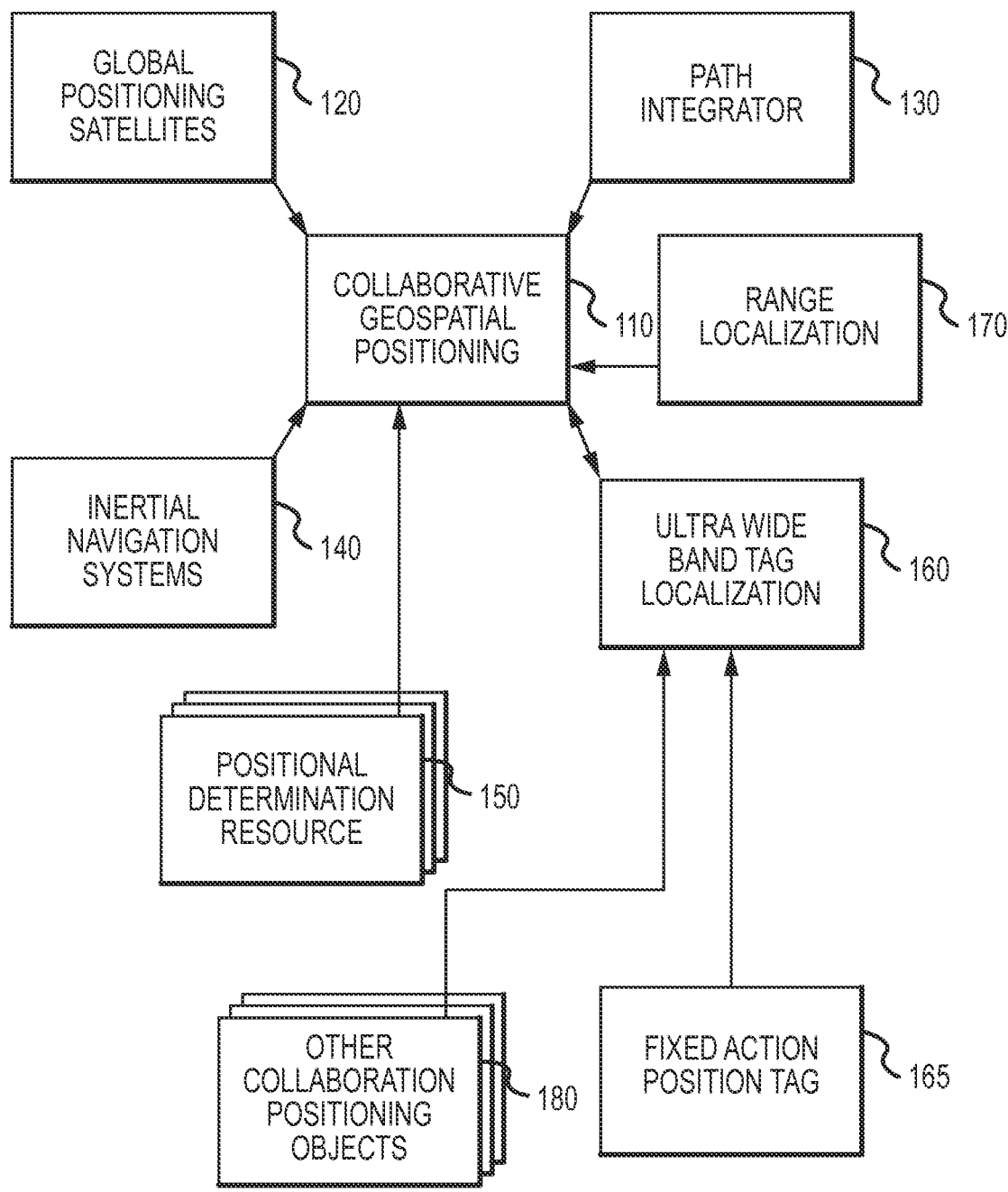
FIG. 1 presents a high level block diagram of a system for collaborative spatial positioning according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disparate positional data derived from one or more positional determinative resources are fused with peer-to-peer relational data to provide an object with a collaborative positional awareness. According to one embodiment of the present invention, an object collects positional determinative information from one or more positional resources so as to independently determine its spatial and relational location. That determination is thereafter augmented by peer-to-peer relational information that can be used to enhance positional determination and modify behavioral outcomes. In addition, the positional determination and behavioral modification can be collaborative among nearby objects. By doing prioritized missions, objectives can be advanced and common taskings can be coordinated. These and other applications of a system and associated methodology for collaborative spatial positioning are possible and contemplated by one or more embodiments of the present invention.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

By the term "substantially," it is meant that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting," "mounted," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent," another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

According to one embodiment of the present invention, a collaborative positional determination approach provides accurate, reliable positioning, including a well-structured balance of positional data obtained from, for instance, Global Positioning System (GPS), laser-based localization, enhanced dead reckoning, and an active tag (ranging) tracking technology that provides local area relative heading and distance. In one implementation of the present invention described above, GPS provides long range positioning and links the relative positioning to the global frame of reference, while laser localization permits a coherent local terrain understanding using a laser mapping strategy. Enhanced dead reckoning handles slippages and improves hazard detection by tracking minute movements of the robot over short intervals and tag tracking capability ensures a bound can be set on error (less than +/−6 inches) and allows a reactive, non-line-of-sight position capability. While the above example describes four means by which to gain positional data, one of reasonable skill in the relevant art will recognize that other positional determinative resources are equally applicable to the present invention and are indeed contemplated in their application and implementation. For example LIDaR (LIght Detection and Ranging or Laser Imaging Detection and Ranging) can be employed as can vision detection systems, and the like.

A key advantage to the approach of the present invention is that it offers redundancy in the sense that each capability complements the others. One of the most immediate applications of the technology is to extend and enhance GPS in areas where GPS is unavailable or inaccurate.

The conventional wisdom is that GPS can be used as the positioning solution, but sufficient error exists such that GPS cannot be used as the primary means to coordinate a variety of critical capabilities such as close quarters movement, multi-vehicle coordination or the need for precise marking and manipulation. Even with differential GPS solutions, the system is not generally robust and reliable under tree cover, in bunkers, caves, buildings and many other situations. To better understand the limitations of GPS consider the following.

GPS is a locational and navigational system that allows users to pinpoint a place on the Earth with reasonable accuracy. The current GPS system makes use of signals transmitted by some of the 24 dedicated satellites circling the globe in precisely defined orbits. Using the satellites as reference points, GPS receivers calculate their positions based on the difference in arrival time of signals from the different satellites. Although GPS was initially developed for the U.S. military to guide missiles to targets, it is now routinely used for air traffic control systems, ships, trucks and cars, mechanized farming, search and rescue, tracking environmental changes, and more.

As mentioned above, GPS is a space-based satellite navigation system that provides location and time information in all weather, anywhere on or near the Earth, where there is an unobstructed line of sight to four or more GPS satellites. (In some cases a location determination can be made with three satellites.) The GPS program provides critical capabilities to military, civil and commercial users around the world and is the backbone for modernizing the global air traffic system, but it is not without its limitations.

To determine a location on the earth, a GPS receiver calculates its position by precisely timing the signals sent by GPS satellites high above the Earth. Each satellite continually transmits messages that include the time the message was transmitted and the satellite position at time of message transmission.

The receiver uses the messages it receives to determine the transit time of each message and computes the distance or range to each satellite. These distances, along with the satellites' locations, are used to compute the position of the receiver. A satellite's position and range define a sphere, centered on the satellite, with radius equal to the range. The position of the receiver is somewhere on the surface of this sphere. Thus, with four satellites, the indicated position of the GPS receiver is at or near the intersection of the surfaces of four spheres. In the ideal case of no errors, the GPS receiver would be at a precise intersection of the four surfaces.

One of the most significant error sources is the GPS receiver's clock. Because of the very large value of the speed of light, c, the estimated distances from the GPS receiver to the satellites, the range, are very sensitive to errors in the GPS receiver clock; for example an error of one microsecond (0.000001 second) corresponds to an error of 300 meters (980 ft). This suggests that an extremely accurate and expensive clock is required for the GPS receiver to work; however, manufacturers prefer to build inexpensive GPS receivers for mass markets. This dilemma is resolved by taking advantage of the fact that there are four ranges.

It is likely that the surfaces of the three spheres intersect, because the circle of intersection of the first two spheres is normally quite large, and thus, the third sphere surface is likely to intersect this large circle. If the clock is wrong, it is very unlikely that the surface of the sphere corresponding to the fourth satellite will initially intersect either of the two points of intersection of the first three, because any clock error could cause it to miss intersecting a point. On the other hand, if a solution has been found such that all four spherical surfaces at least approximately intersect with a small deviation from a perfect intersection, then it is quite likely that an accurate estimation of receiver position will have been found and that the clock is quite accurate.

The current GPS system is comprised of three segments; the space segment, the control segment and the user segment. The space segment (SS) is as one might imagine, composed of the orbiting GPS satellites. The orbits are centered on the Earth, not rotating with the Earth, but instead fixed with respect to the distant stars. The orbits are arranged so that at least six satellites are always within line of sight from almost everywhere on Earth's surface. The result of this objective is that the four satellites are not evenly spaced (90 degrees) apart within each orbit. In general terms, the angular difference between satellites in each orbit is 30, 105, 120, and 105 degrees apart, which, of course, sum to 360 degrees.

The control segment is composed of a master control station (MCS), an alternate master control station, four dedicated ground antennas, and six dedicated monitor stations. The flight paths of the satellites are tracked by dedicated monitoring stations. Then the agency responsible for the satellites contacts each GPS satellite regularly with navigational updates using dedicated or shared ground antennas. These updates synchronize the atomic clocks on board the satellites to within a few nanoseconds of each other, and adjust the ephemeris of each satellite's internal orbital model.

The user segment is composed of hundreds of thousands of U.S. and allied military users of the secure GPS Precise Positioning Service, and tens of millions of civil, commercial and scientific users of the Standard Positioning Service. In general, GPS receivers are composed of an antenna, tuned to the frequencies transmitted by the satellites, receiver-processors, and a highly stable clock (often a crystal oscillator). They may also include a display for providing location and speed information to the user. Each segment introduces error into the equation and while GPS provides reliable information regarding the general location of an object, it fails to provide precision information. Moreover, it is fundamentally limited in that it requires an unobstructed line of sight to each of at least 4 satellites.

To address some of the limitations of GPS, it has been determined that localization based on range information (i.e. video, radar, sonar or laser data) can provide positional improvements especially in urban situations or outdoor areas with visible features. According to one embodiment of the present invention, GPS technology is seamlessly integrated with simultaneous localization and mapping to provide enhanced navigation, search and detection. Clear, persistent features that can be seen by the laser or other range finding apparatus can provide very robust data regarding the surrounding environment. In situations in which there are known locations of persistent objects, a laser (or other range finder) can be integrated with GPS data to narrow the variances in positional awareness. For example if a GPS signal provides a location within a number of meters and based on that location the device should be able to identify two or more puissant objects of a known location, the range information can be used to improve the accuracy of the GPS position. However, this technology has definite limitations, especially if there are no persistent obstacles for the system to localize off of and again, laser or range technology in general requires an unobstructed line of sight to the persistent objects, as well as that the identified objects must be of a known location.

Another type of positional sensor that is contemplated by the present invention is an inertial sensor. Together with radio beacons and GPS, inertial sensors form the basis for most navigation systems in aircraft. Inertial systems operate based on perceptions of motion; that is the measurements of acceleration and displacement from a known position. If an object knows its starting location, using data that provides both linear and angular acceleration and the laws of motion, the displacement of an object from that known location can be determined. Gyroscopes, both mechanical and optical, can be used to measure linear and angular motion through applications of the law of conservation of momentum. Unlike GPS or range localization, inertial navigational systems are self-contained. That is, they do not depend on any other source of information to determine an objects position. For example, if a device equipped with an inertial navigation system was instructed to proceed from its current location to another location measured from its point of origin, the device would know when it arrived at that location as well as its position at any time during the motion, relative to its origin. It would not matter if it was in an open field or in the basement of a building or in a cave. However, inertial navigation systems are only as good as the initial data that was input into the system (its initial location) and any precession in the equipment over time. All inertial navigation systems suffer from integration drift: small errors in the measurement of acceleration and angular velocity are integrated into progressively larger errors in velocity, which are compounded into still greater errors in position. Since the new position is calculated from the previous calculated position and the measured acceleration and angular velocity, these errors accumulate roughly proportionally to the time since the initial position was input. Therefore, the position must be periodically corrected by input from some other type of navigation system. The accuracy of an objects' location varies based on the accuracy of the initial data and a point at which the objects' actual position was updated.

A related means by which to determine position, and one contemplated by the present invention, is dead reckoning or path integration. In navigation, path integration is the process of calculating one's current position by using a previously determined position, or fix, and advancing that position based upon known or estimated speeds over elapsed time and course. Animals and humans instinctively practice path integration. For example, when you get up from a desk and go down the hall to the coffee room, you record distance of travel, turns and stops. If you would attempt to make the same trip with your eyes closed, accuracy would surely suffer, but most individuals would be able to recreate their path and/or understand their position.

Path integration is subject to cumulative errors. While the use of GPS and other positional resources have made simple dead reckoning seemingly obsolete, for most purposes, dead reckoning can provide very accurate directional information and positional information. Dead reckoning may give the best available information on position, but is subject to significant errors due to many factors, as both speed and direction must be accurately known at all instants for position to be determined accurately. For example, if displacement is measured by the number of rotations of a wheel, any discrepancy between the actual and assumed diameter, due perhaps to the degree of inflation and wear, will be a source of error. As each estimate of position is relative to the previous one, errors are cumulative.

Dead reckoning can be implemented to overcome the limitations of GPS technology. Satellite microwave signals are unavailable in parking garages and tunnels, and often severely degraded in urban canyons and near trees due to blocked lines of sight to the satellites or multipath propagation. In a dead-reckoning navigation system, the system is equipped with sensors that know the wheel diameter and record wheel rotations and steering direction. The navigation system then uses a Kalman filter, that is an algorithm that uses a series of measurements observed over time, containing noise (random variations) and other inaccuracies, and produces estimates of unknown variables that tend to be more precise than those based on a single measurement alone, to integrate the available sensor data with the occasionally unavailable position information into a combined position fix. Using this method a navigation system in a car, for example, can tolerate going into a tunnel or traveling between large buildings that would otherwise obscure the GPS signal.

Another component of the collaborative positioning approach of the present invention involves using active ranging technology such as an ultra wide-band (UWB) radio frequency (RF) identification (ID) tag (collectively RFID). An RFID system consists of tags, a reader with an antenna, and software such as a driver and middleware. The main function of the RFID system is to retrieve information (ID) from a tag (also known as a transponder). Tags are usually affixed to objects such as goods or animals so that it becomes possible to locate where the goods and animals are without line-of-sight. A tag can include additional information other than the ID. As will be appreciated by on or reasonable skill in the relevant art other active ranging technology is equally applicable to the present invention and is contemplated in its use. The use of the term "tags" or "RFID tags," or the like, is merely exemplary and should not be viewed as limiting the scope of the present invention.

An RFID reader together with an antenna reads (or interrogates) the tags. An antenna is sometimes treated as a separate part of an RFID system. It is, however, more appropriate to consider it as an integral feature in both readers and tags since it is essential for communication between them. There are two methods to communicate between readers and tags; inductive coupling and electromagnetic waves. In the former case, the antenna coil of the reader induces a magnetic field in the antenna coil of the tag. The tag then uses the induced field energy to communicate data back to the reader. Due to this reason, inductive coupling only applies in a few tens of centimeter communication. In the latter case, the reader radiates the energy in the form of electromagnetic waves that possess much longer range opportunities. Some portion of the energy is absorbed by the tag to turn on the tag's circuit. After the tag wakes up, some of the energy is reflected back to the reader. The reflected energy can be modulated to transfer the data contained in the tag.

In one implementation of the present invention a RFID or UWB tag cannot only be associated with a piece of stationary infrastructure with a known, precise, position, but also provide active relative positioning between objects. Moreover, the tag can be connected to a centralized tracking system to convey interaction data. As a mobile object interacts with the tag of a known position, the variances in the objects positional data can be refined. Likewise, a tag can convey between objects relative position and relative motion. Such tags possess low-detectability and are not limited to line of sight nor are they vulnerable to jamming. And, depending on how mounted and the terrain in which they are implemented, a tag and tracking system can permit user/tag interaction anywhere from 200 ft to 2 mile radius of accurate positioning. Currently, tags offer relative position accuracy of approximately +/−12 cm for each interactive object outfitted with a tag. As will be appreciated by one or reasonable skill in the relevant art, the use of term object is not intended to be limiting in any way. While the present invention is described by way of examples in which objects may be represented by vehicles or cellular telephones, an object is to be interpreted as an arbitrary entity that can implement the inventive concepts presented herein. For example, an object can be a robot, vehicle, aircraft, ship, bicycle, or other device or entity that moves in relation to another. The collaboration and communication described herein can involve multiple modalities of communication across a plurality of mediums.

As previously discussed, conventional sensor fusion approaches involve continuous receipt and transmission of detailed raw data that requires high bandwidth communications systems. High bandwidth communications systems are very expensive and this approach often imposes a high workload on users or analysts to extract locally relevant insights across even a few modalities to geographically separated users. Moreover, existing strategies do not answer the questions "Where do I go (or not go) from here?" or "What is moving towards me?" in a timely manner.

FIG. 1 presents a high-level block diagram of a system 100 for collaborative spatial positioning according to one embodiment of the present invention. According to one embodiment of the present invention, an object 110 can employ collaborative spatial positioning by receiving positional information from one or more positional determination resources 150. These resources can, in one embodiment of the present invention, include global positioning satellites 120, path integration 130, inertial navigation systems 140, ultra wide band tag localization 160, and range localization 170.

As is described herein, the present invention combines various forms of positional data to arrive at a spatial representation of an object in its environment. In one instance, that representation may be globally based on geospatial data, however, in other instances, the representation may be based on a different set of reference indicators or an object may generate its own frame of reference. Indeed, the present invention contemplates scenarios in which one or more objects, or groups of objects, can operate or generate differing frames of reference (spatial awareness) that are seamlessly integrated.

In one implementation of the present invention, the object 110 receives position information or data from various positional determination resources 150 that aids in the object's determination of its geospatial location. As one of reasonable skill in the relative art will appreciate, and as discussed above, each positional determination resource 150 possesses advantages and disadvantages. GPS 120, for example, requires an unobstructed line of sight to (optimally) 4 orbiting satellites that each transmit separate and time identification signals. Based on the reception delay of the received signals, the receiver can compute a probabilistic location. But, should the object 110 enter a building or region in which the line of sight between these satellites is obstructed or obfuscated, the positional determination becomes unreliable. Moreover, despite GPS' worldwide acceptance for general locational services, it does not provide adequate accuracy for precision movements.

Similarly, the object 110 may receive positional information from an inertial navigation system 140. Unlike GPS 120, an inertial navigation system measures accelerations and time to determine relative displacement of the object 110 from an initial starting position. Thus, moving into a building, cave or under a canopy of trees does not affect the operation of such a system. However, the system is limited by not only the accuracy of its starting point but also its ability to maintain a stable platform. If the location of its initiation point is in error, then its determination of position based on displaced motion is also in error. Such platforms are also known to precess, meaning that over time the system is less and less accurate. This precession is magnified if the accuracy of the starting point is questionable. If the system, during operation, is updated to provide parameters for its variance, it can assume that the update is accurate and thus the difference from where it is, based on the update, and where it thinks it should be, is based on drift in the system. The system can then continue to adjust for such drift. However, if the initial location was inaccurate, an update can introduce error rather than eliminate error, making the system more inaccurate than if it was simply left alone. As one of reasonable skill in the art will appreciate, as with GPS, inertial navigation systems also have their limitations.

The present invention integrates positional information from a plurality of sources so as to determine the object's 110 spatial location. GPS 120, inertial navigations systems 140, path integration 130, range localization 170 and other positional determinative resources 150 are synthesized by the collaborative spatial positioning process to arrive at an optimal, reliable and accurate position. This synthesis includes weighing each source based on its perceived accuracy and historical variance. By doing so, the determination and accuracy of an object's position can be maintained despite varying degrees of accuracy and reliability of any one positional determination resource. According to another embodiment of the present invention, the process by which positional determinative resources 150 are combined can also be based on agreement or disagreement between resources as to the location of the object. For instance if three of four positional resources agree as to the location of the object, the fourth determination can be dismissed as likely being in error. However, the determination of which resource to rely upon becomes more difficult when there are multiple conflicts or multiple agreements as to a differing location of the object. According to one embodiment of the present invention, the positional determinative resources are prioritized based on a plurality of factors. Using this sort of priority schedule, a determination can be made as to which resource (or combination of resources) to rely upon should there exist a conflict between the individual positional determinations. For example, a GPS determination of an object's position (albeit inaccurate) may generally agree with a vision detection system's determination. But both of these disagree with that produced by a laser system that, while very accurate, possesses ambiguity as to which target it is measuring. Thus, one or more embodiments of the present invention assign and assess a value on each positional determination resource and then balance these determinations to arrive at the highest probable location. By combining positional determination resources in such a manner, those sensors that provide unambiguous reports such as UWB tags, RFID tags, GPS and the like, can be used to provide a 'rough' location of a target and then resources that possess more precision (albeit sometimes ambiguous) can be used to refine the locational information.

For example, one object may be able to determine the location of another nearby object or target using UWB tags or GPS to within 2 meters. Using that information, a laser range finder can be trained to that general location to reduce the accuracy of the locational information to millimeters. However, if the laser was used independently, it may just as well identify another target 3 meters to the left as the laser's field of view is very narrow. Rules can be developed and established regarding the collaboration of positional determinative resources.

The present invention goes beyond fusion of sensory data by also capturing and using the positional awareness of other objects in the system 100. This peer-to-peer communication enables otherwise isolated objects to ascertain a precise positional determination based not only on internal sensory data but the positional determination and data of one or more other objects or nodes.

According to one embodiment of the present invention, and as shown in FIG. 1, a communication link is established between other collaborative spatial positioning objects 110, 180. In one implementation of the present invention, a UWB tag 160 provides a means by which to exchange data and positional awareness between two or more objects within the system 100. The collaborative nature of the exchange of data between objects lets each object not only determine its relative position independently, but gain additional resources and accuracy by linking to that of another object. Moreover, each object can provide the other with not only its position in a spatial sense, but its relative local position. For example, two linked objects may know within a certainty their spatial location within 1 meter, but at the same time be able to provide a relative position with accuracy to a few centimeters. In addition, linking to additional objects can enable a single object to determine its relative positions and, in some instances, its geospatial position. In other instances of the present invention, such a communication link between other objects can be used to provide additional data to enhance internal positional determination capabilities. Moreover, the data that is conveyed can be at various levels of specificity. For example, in one embodiment of the present invention, each object can independently determine its spatial position. That object can then convey its determination of its spatial position to other objects within the same frame of reference. Alternatively and according to another embodiment of the present invention, objects can convey specific positional data about its spatial position which can then be discretionarily used by other objects. For example, an object can convey that, within a certain reference frame, its location is X with a certain degree of variance. Alternatively, or in addition, it can also convey GPS information, inertial information, range triangulation information, etc., so that the receiving entity can then use or discard such specific information based on accuracy or data it requires to enhance its own spatial awareness. This combination of accurate relative position data combined with a collaborative spatial position determination enables embodiments of the present invention to accurately integrate combined motion and activities, including predictive behavior and interactions.

And while the invention has been, and will be, particularly shown and described with reference to embodiments, it will be understood by those skilled in the art that various other changes in the form and details may be made without departing from the spirit and scope of the invention.

Figure 2:
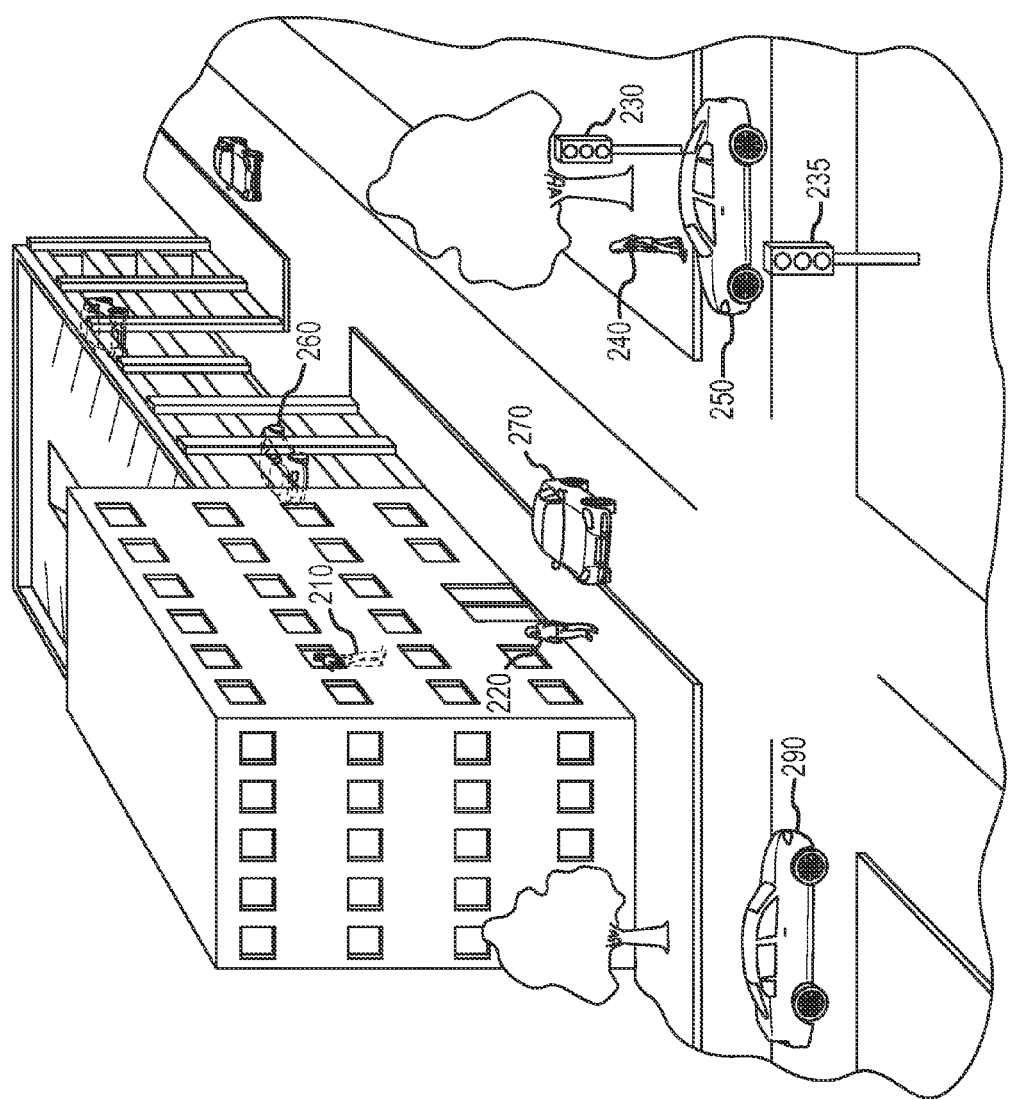
FIG. 2 shows a makeshift urban environment in which collaborative spatial positioning according to one embodiment of the present invention may be implemented.

To better understand the complexities of the collaborative spatial positioning system of the present invention, consider the following simplified example. FIG. 2 shows a makeshift urban environment in which collaborative spatial positioning according to one embodiment of the present invention may be implemented.

Assume a plurality of objects 210, 220, 240, 250, 260, 270 exists wherein each internally possess the ability to utilize one or more positional resources to determine their spatial location. For example, each object may possess a GPS receiver, inertial systems, laser localization, dead reckoning technology, and the like, and as well as being equipped with a UWB tag for interactive communication. Each, however, has differing abilities to utilize each of their resources. For example, two of the objects 210, 220 may be in a location, a building for example, where a GPS signal is not available or where there is limited range localization opportunities, but each possess accurate data with respect to the local environment. In essence they cannot independently determine their geospatial position. That is, they may have a map of the environment, but they don't know where they are on the map. A third and fourth object 240, 250 possess a GPS location, but given the signal strength and interference, its accuracy is questionable. However, both of these objects 240, 250 are within range of known positional markers 230, 235. The markers possess a known geospatial location and, using relative locational technology, the objects close to that tag, despite having poor GPS reception, can accurately determine their location.

As one of reasonable skill in the relative art will appreciate, to determine a spatial position based on range information requires three independent sources. An object receiving a signal from a transmitter can determine it is of a certain range from that transmitter. Knowing the transmitter's location, the receiver can conclude its position is on the surface of a sphere whose radius is the range of transmission and whose origin is the location of the transmitter. Receiving information from two such sources provides the intersection of two spheres which forms a circle. Thus, the receiver in this example resides somewhere in the intersecting circle. Ideally, three intersecting spheres identifies the point at which the receiver resides. However, it is possible to use an object's independent determination of its spatial location to reduce the locus of points of where it is located. An object receiving range information from two known positions 230, 235 knows it exists on a circle defined by the intersection of two spheres. But it itself possesses information regarding its spatial location that can be integrated with the received information to refine its spatial location.

Continuing with the example shown in FIG. 2, assume further that two nearby objects 240, 250 are in communication with each other and both are in communication with fixed markers (streetlights) 230, 235. But as previously indicated, the independent geospatial resources (GPS) of the two objects 240, 250 is unreliable. However, each can act as a third source of positional data to assist in the other to arrive at a more refined and precise spatial location. As mentioned, the data received from the fixed location markers 230, 235 provides an intersection location of a circle. From the first object's 230 perspective, range information from the other object 250 can result in a definitive geospatial location. That information combined with its internal variances can provide that object 230 with a better, more refined determination of its location. This type of peer-to-peer spatial location can be used to determine the location of an object absent of any communication to a fixed marker. The more object interaction, the more accurate the location.

According to one embodiment of the present invention, the positional information of one object 240 ascertained in part by markers 230, 235 and its GPS (or interaction with other objects) can be conveyed via a peer-to-peer communication to other objects 270, 250, 220. The car 250 next to the markers 230, 235 will also possess accurate positional data ascertained from the markers 230, 235 and other nearby objects. However, the car in the intersection 270 and, more importantly, the object within the building 220 may find the positional data possessed by another object very valuable.

With such relative positional data the other objects 220 can determine their spatial location that is thereafter supplemented by their internal systems to aid in positional awareness. Moreover, an object that is further isolated in the building 210 can use information that is relayed via a daisy chain or a mesh network to gain accurate positional information.

In the same manner, an individual who cannot independently determine their position from GPS or other sources can leverage known spatial data of nearby objects. The person in the lobby of the building can, according to one embodiment of the present invention, determine its location despite its inability to receive any GPS data because it can receive data from other nearby objects 270, 290, 240, 230, 235 whose position is known. With its position known, and possessing a map of its local environment, it can navigate with a great deal of accuracy to areas without any traditional geospatial support. And as the person in the lobby 220 now knows its geospatial location, it can convey that information to other isolated objects 210. If for example, the person on the third floor 210 can receive data from the person in the lobby 220 and two others, it too can determine its spatial location. This process can daisy chain so as to provide spatial location based on sources that they themselves have determined their spatial location from indirect sources.

Spatial and relative positional data can be conveyed from and between other isolated objects. For example, a car located in a parking garage 260 can include a collaborative spatial positioning apparatus or system as well as can a cellular phone carried by its driver. While driven, the car can gain GPS signals and, upon entering into the garage, the car can use path integration or inertial navigation to generally ascertain its position within the garage. Using data from either fixed or other nearby objects, these objects can determine and refine their spatial location. Moreover, the individual within the building 210 can also establish relative locational data with the car 260 should they need to reunite at the end of the day.

Figure 3:
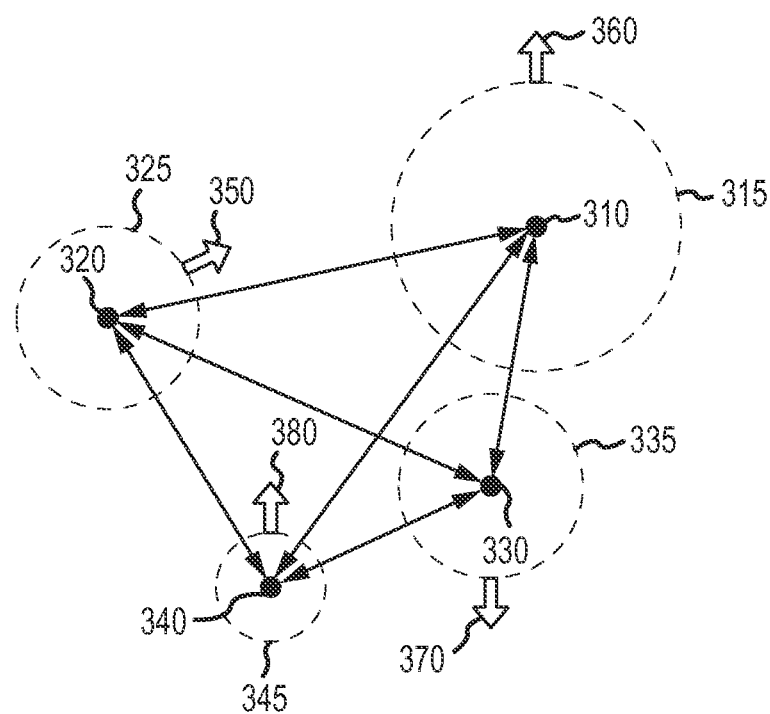
FIG. 3 shows a high level depiction of a mesh network interaction of a plurality of objects possessing collaborative spatial positioning technology.
Figure 3:
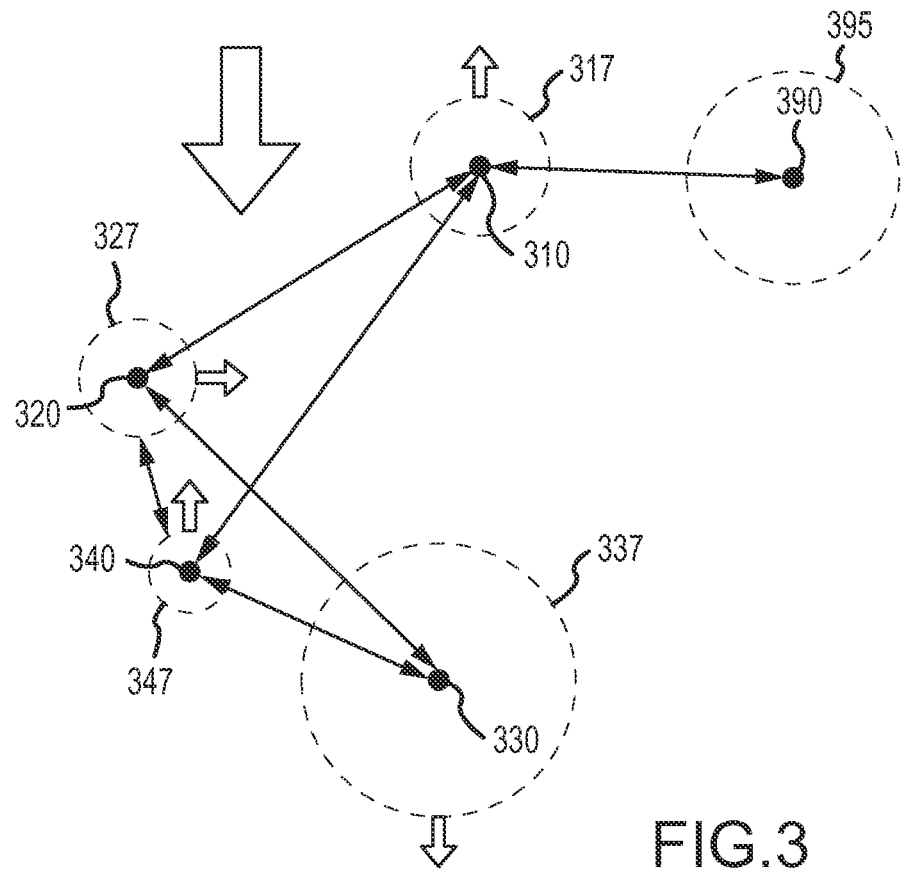

Another aspect of the present invention is its ability to collaboratively share and use spatial and relational data. FIG. 3 shows a high level depiction of a mesh network interaction of a plurality of objects possessing collaborative spatial positioning technology. In the upper portion of FIG. 3, four objects 310, 320, 330, 340 are within collaborative range of each other and are each communicatively linked forming what one of reasonable skill in the relevant art would recognize as a mesh network.

Surrounding each object 310, 320, 330, 340 is a ring 315, 325, 335, 345 representing the variance, or error, of each object's independent determination of its spatial position. In addition, each object includes an arrow 350, 360, 370, 380 representing the relative motion of each object. As objects come within communication range of each other, new objects are joined to an existing mesh while others exit the network. While one could abstractly view a mesh network as an infinite number of nodes, it is unlikely that such a network is feasible. A more likely scenario is a mesh network based on a central or regional control node or autonomous mesh with a limited number of nodes. In the later example, one node is established a controlling node while a finite number of client or slave nodes form the mesh. As new nodes enter or nodes exit the relationship, control of the mesh is reevaluated as is the interaction and overlapping of mesh networks. Furthermore, nodes can exist in two or more mesh networks resulting in an overlap of data transfer. Obviously, packet and data collisions within the networks must be resolved and are beyond the scope of this discussion. For the purposes of the present invention, assume that the objects shown in FIG. 3 can form and maintain a mesh network operable to support the interaction of data among the nodes in the network.

In doing so, relevant spatial data can be conveyed from one object to another. The lower depiction of the mesh network of FIG. 3 shows modified variances 315, 325, 335, 345 for each object 310, 320, 330, 340 based on the newly acquired spatial and relational data. For example, the variance 315 of an object 310 can decrease to form a new variance 317 based on newly acquired information. As the network changes, variances can increase as well 337. As new nodes 390 (and their variances 395) enter into the network, the exchange of relational and spatial data enables a continual modification of each object's ability to determine its collaborative spatial position and, in one embodiment, affect its behavior.

Figure 4:
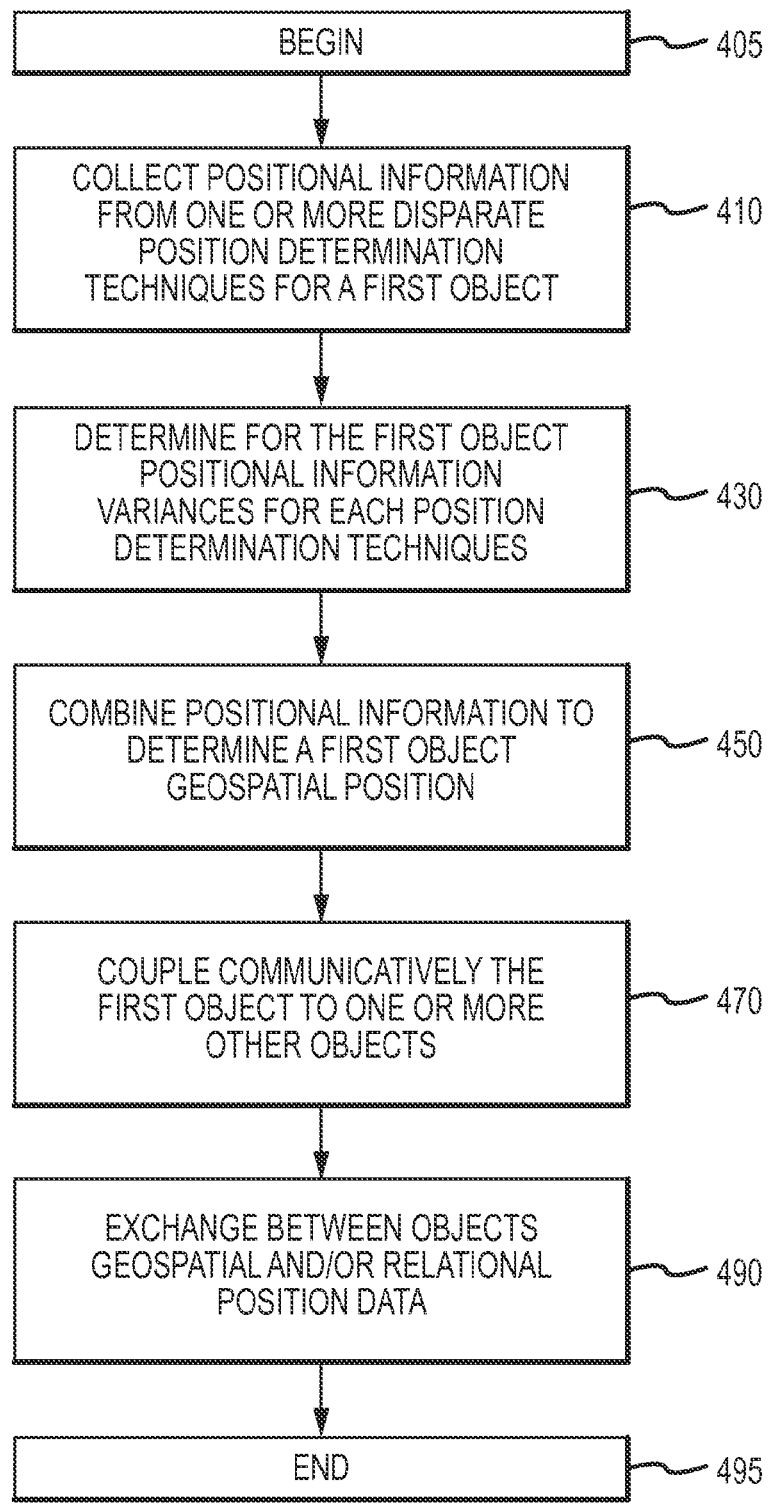
FIG. 4 is a flowchart depicting an example of the methodology that may be used to collaborate positional information according to the present invention.

FIG. 4 is a flowchart depicting one example of the methodology that may be used to collaborate positional information according to the present invention. It will be understood by one of reasonable skill in the relevant art that each block of the flowchart illustrations, and combinations of blocks in the flowchart illustrations (and other flowchart illustrations in this application), can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture, including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware or firmware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words," or the like. These specific words, however, are merely convenient labels and are to be associated with appropriate information elements.

Unless specifically stated otherwise, discussions herein using words such as "processing," "computing," "calculating," "determining," "presenting," "displaying," or the like, may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

An exemplary process for collaborative spatial positioning according to the present invention begin 405 with the collection 410 of positional information from one or more disparate positional determination techniques or resources. These resources can include inertial systems, GPS, path integration, range localization, and the like. For an object, positional variances for each positional information resources are determined 430 so that the information provided by each resource can be weighed and valued by the object. Those with a high degree of accuracy and reliability are normally weighed and valued more than those with less accuracy and lower reliability. These variances are continually monitored and updated so that the computed spatial position is optimized.

The positional information, once evaluated and weighed, is thereafter combined 450 to determine for an object its spatial position. In addition to the individual variances of each informational source, the overall determination of position is bound so as to convey to other objects the degree of accuracy by which an object is conveying its position.

Objects are communicatively coupled 470 so as to exchange 490 spatial and relational positional information that can be then used to refine each objects' spatial location. The accuracy and reliability of this information is also conveyed so that the receiving object can determine the value of the information conveyed.

The present invention integrates localized relational positional data with fused sensor data relating to spatial positioning. By doing so, objects are not only able to more accurately determine their spatial location in a variety of environments, but, when necessary, modify their behavior based on the location and relative motion of nearby objects.

Figure 5:
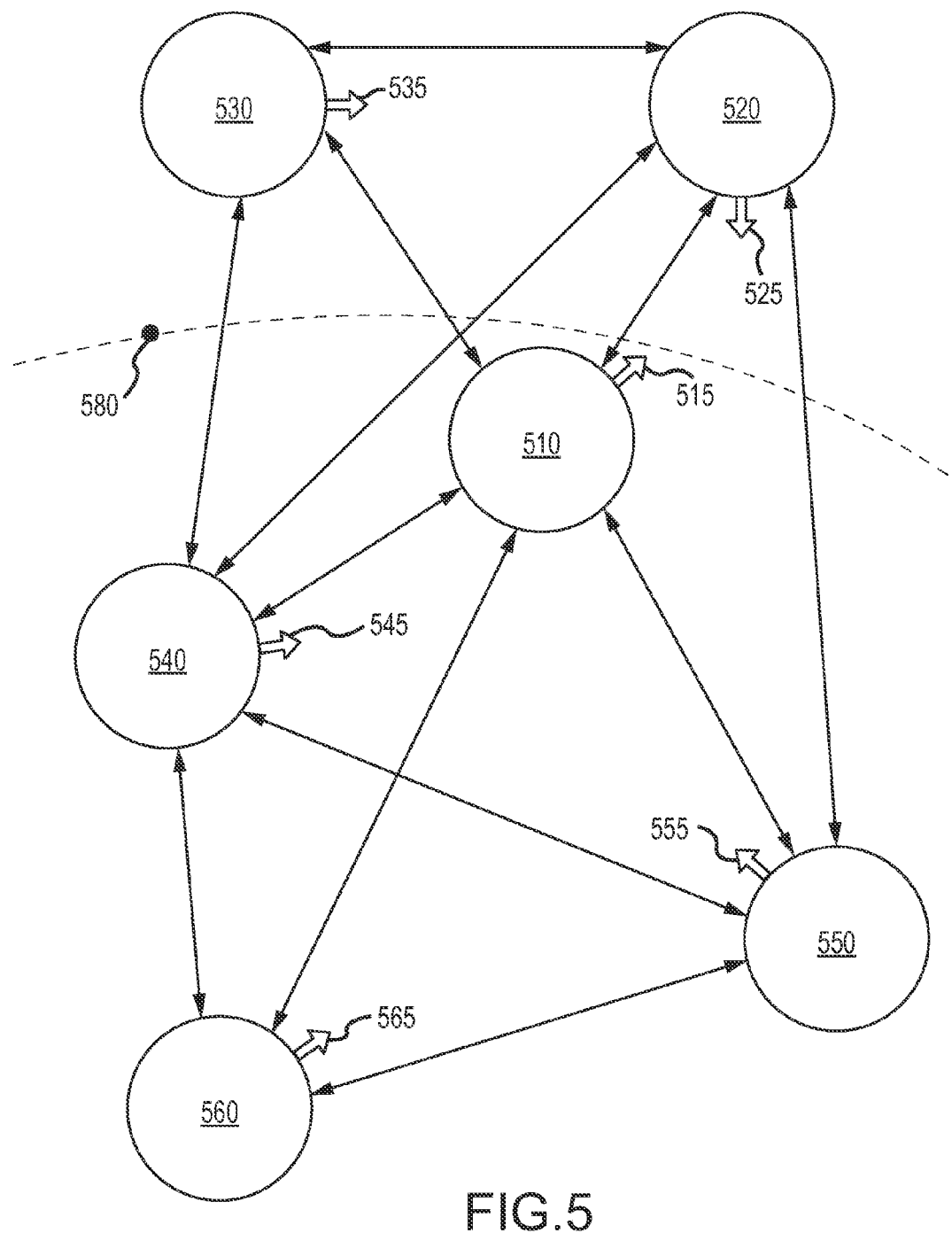
FIG. 5 is a high level graphical depiction of a plurality of collaborative objects using positional determination and collaborative behavior modification according to one embodiment of the present invention.

FIG. 5 is a high level depiction of a plurality of objects using distributed spatial positional and collaborative behavioral determination according to one embodiment of the present invention. In the rendering of FIG. 5 six (6) objects 510, 520, 530, 540, 550, 560 are operating in the same geographic location. One skilled in the relative art will appreciate that the "local" geographic location is, for the purpose of the present invention, only limited by communicative technology. In one instance the objects may be within meters of each other and in other instances miles apart.

FIG. 5 further indicates that each object possesses a certain range of awareness centered around that object. For example, assume that the central object 510 is aware of each of the remaining objects 520, 530, 540, 550, 560 while the object 560 in the lower left quadrant possesses an awareness range 580 that is only sufficient to capture knowledge of three nearby objects 510, 540, 550. According to one embodiment of the present invention, these nearby objects 510, 540, 550 can relay information to a distant object 560 to enhance that object's ability to determine is spatial awareness.

The detection and interaction with nearby objects enables each object to develop a spatial representation of its surrounding. As shown in FIG. 5 and in accordance with one embodiment of the present invention, each object's awareness of nearby objects not only includes is relative position but also the object's state. That is the object's relative motion, speed, mission objective, capabilities, and the like. The motion of each object is shown in FIG. 5 as a large arrow 515, 525, 535, 545, 555, 565. As the objects interact and refine their spatial position they further collect information such as speed and direction of travel of nearby objects. This enables each object to create a local spatial representation or awareness of its environment.

Figure 6:
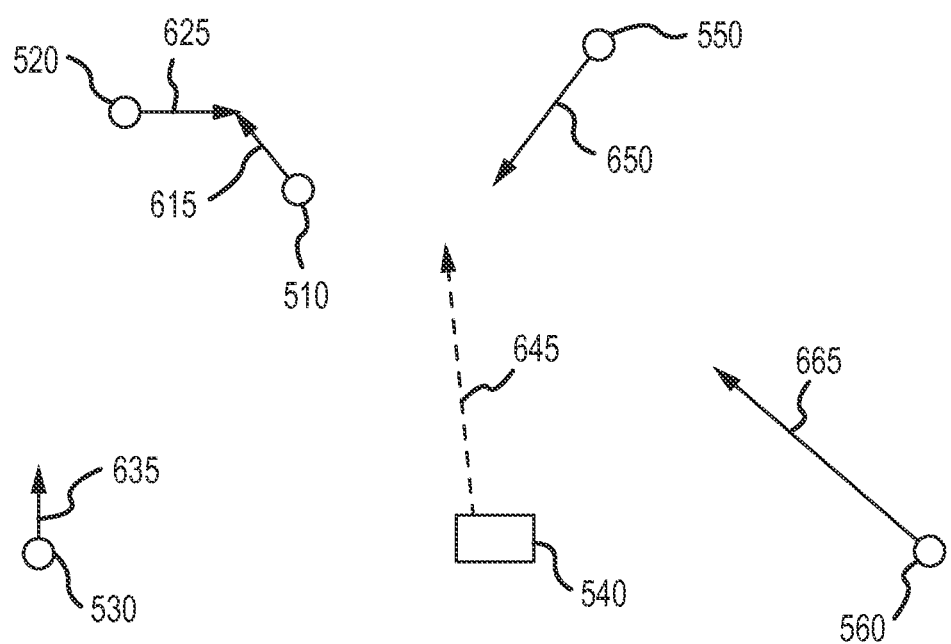
FIG. 6 is an object centric relational representation of a plurality of nearby objects shown in FIG. 5 as can be determined according to one embodiment of the present invention.

FIG. 6 is an object centric relational representation of the plurality of nearby objects shown in FIG. 5 as can be determined according to one embodiment of the present invention. The rendering shown in FIG. 6 is object centric about the left most object in FIG. 5 540. That is to say that the rendering of FIG. 6 provides relational information regarding nearby objects from the perspective of one object 540. While each object's spatial representation may represent the same data, each would be different and independent. Moreover, each may have different variances in positional reliability and accuracy. Turning to FIG. 6, the central object 540 detects five (5) other nearby objects. From its perspective, three objects 510, 520, 530 are on its left side and two 550, 560 are on its right. All of the objects are either abreast of its position or in front of its position. Thus, the spatial representation provides to the centric object 540 relational positional data regarding each nearby object.

The representation of each nearby object 510, 520 530, 550, 560 further includes object attributes including motion of the object. In this embodiment of the present invention, the relative motion of each nearby object is shown by an arrow 615, 625, 635, 655, 665 wherein the length of the arrow represents speed relative to the central objects' speed and direction 645. For example, the motion of the leftmost object 530 and that of the center object 540 are essentially parallel. However, the leftmost object 530 is moving considerably slower that the center object 540 as seen by a comparison of the size of the two directional arrows 635, 645. Similarly, the speed of the center object 540 and the lower right object 560 are similar but each is oriented in a different direction. In another embodiment of the present invention, the spatial representation shown in FIG. 6 can be purely object centric while in another it can utilize a common frame of reference.

The spatial representation shown in FIG. 6 can also, in other embodiments of the present invention, include additional information such as an indication of the positional reliability of each object or whether an object has a higher mission priority than another. For example, an object can be shown as a dot within a circle where the dot represents the determined spatial position of the object and the size of the circle the variance of that determination. A small circle surrounding a dot indicates the location is highly reliable and accurate while a larger circle means that the actual position, while represented as being in the center of the circle, may be anywhere within the circle.

FIG. 7 is another object centric relational representation of a plurality of nearby objects shown in FIGS. 5 and 6 showing one embodiment of behavior modification according to one embodiment of the present invention. In this case, the spatial representation shown is based on the central object of FIG. 5 510. Accordingly, three objects 540, 550, 560 are behind the central object 510 and two objects 520, 530 are in front of the object 510. FIG. 7 includes motion vectors consistent with FIG. 6, albeit in a relational representation to a different object 510.

In addition to relative positional information (range and bearing) and speed of travel, FIG. 7 further includes behavioral information. In this case, the mission objective of the central object 510 is represented as a star 720 and its proposed route to the objective 770 is represented by a dashed line 710. Alongside the proposed route 710 is the central object's motion vector 715. FIG. 7 further depicts the mission objective of a nearby object 520 as a pentagon 780 and that object's motion vector 725.

According to one embodiment of the present invention, each object prioritizes state information received from each of the nearby objects. Assume for the purposes of this example that by predefined criteria the mission objective 780 of the nearby object 520 was higher than the mission objective 770 of the current object 510. According to one embodiment of the present invention, the behavior engine in coordination with the spatial awareness engine in each object independently determines that, should the objects maintain their current course and speed, a collision between the objects is likely. Based on the interaction of the objects and the state information conveyed, each object prioritizes their respective objectives 770, 780. The central object shown in FIG. 7 is aware that a collision is likely and that its objective has a lower degree of priority. Thus, the behavior engine modifies the proposed course to a secondary route 750 or, alternatively, stop until the collision potential is averted. The other nearby object 520, having a higher priority objective, maintains its proposed route to its objective 780. Significantly, this determination, while coordinated, is made independently by each object.

One skilled in the relevant art will appreciate that as objects move and their spatial relationship changes, individual prioritization and behavioral modifications must change as well. While each of the objects provide peer-to-peer integration of data, each make independent behavioral determinations. The independent and relative positional awareness, combined with increased positional accuracy, enables a plurality of objects to work together to achieve group oriented tasks. For example, it is possible to accomplish group behaviors such as distributed search and detection, foraging for assets or establish a convoy to enable efficient transportation. According to one embodiment, each object, through the use of a UWB tag, can emit a signal that acts to repel or attach other objects. A signal used in an attraction mode, meaning that the receiving object's objective is to get closer to the source, can drive the objects to congregate or follow each other. If the force is used to repel, the objects can disperse. This feature, combined with a coordinated mission objective, can lead to search or convoy behaviors. Spatial awareness combined with behavioral modifications and prioritization result in meaningful collective behavior.

One aspect of collaboration, according to the present invention, is relative spatial awareness of each robot and a human team member. The invention allows people, UAS, UGVs, USVs and UUVs and manned vehicles or objects to coordinate within a common framework using tags (or other means) that are trivial to add and remove. The present invention does not require infrastructure in terms of Differential GPS towers or fiducial markers. Nor does it require that each system be modified to share position information explicitly. Each vehicle (object) can maintain its own spatial awareness (map), its own positioning scheme and its own perspective. While possible, it is not necessary to merge these or correlate them. Instead, all that is necessary is to allow neighbor interactions to unfold. Also, because of the neighbor interaction, the system of the present invention is fault-tolerant and is not vulnerable to a centralized attack or failure.

According to another embodiment of the present invention, a plurality of objects can coordinate their behaviors to optimize their collective actions and/or act to achieve a common outcome. For example, and according to one embodiment of the present invention, objects can coordinate among themselves as they move through varied terrain to do a variety of missions. Embodiments of the present invention can be implemented to include the ability to search, detect, confirm, mark and neutralize improvised explosive devices or to deliver supplies in a combat zone. The invention can also be used to conduct lead and follow operations or deliver goods to a variety of locations. Heterogeneous objects and capabilities can provide advantages in terms of mission pace, range and duration, coverage, efficiency, probability of detection safety and adaptability.

Figure 8:
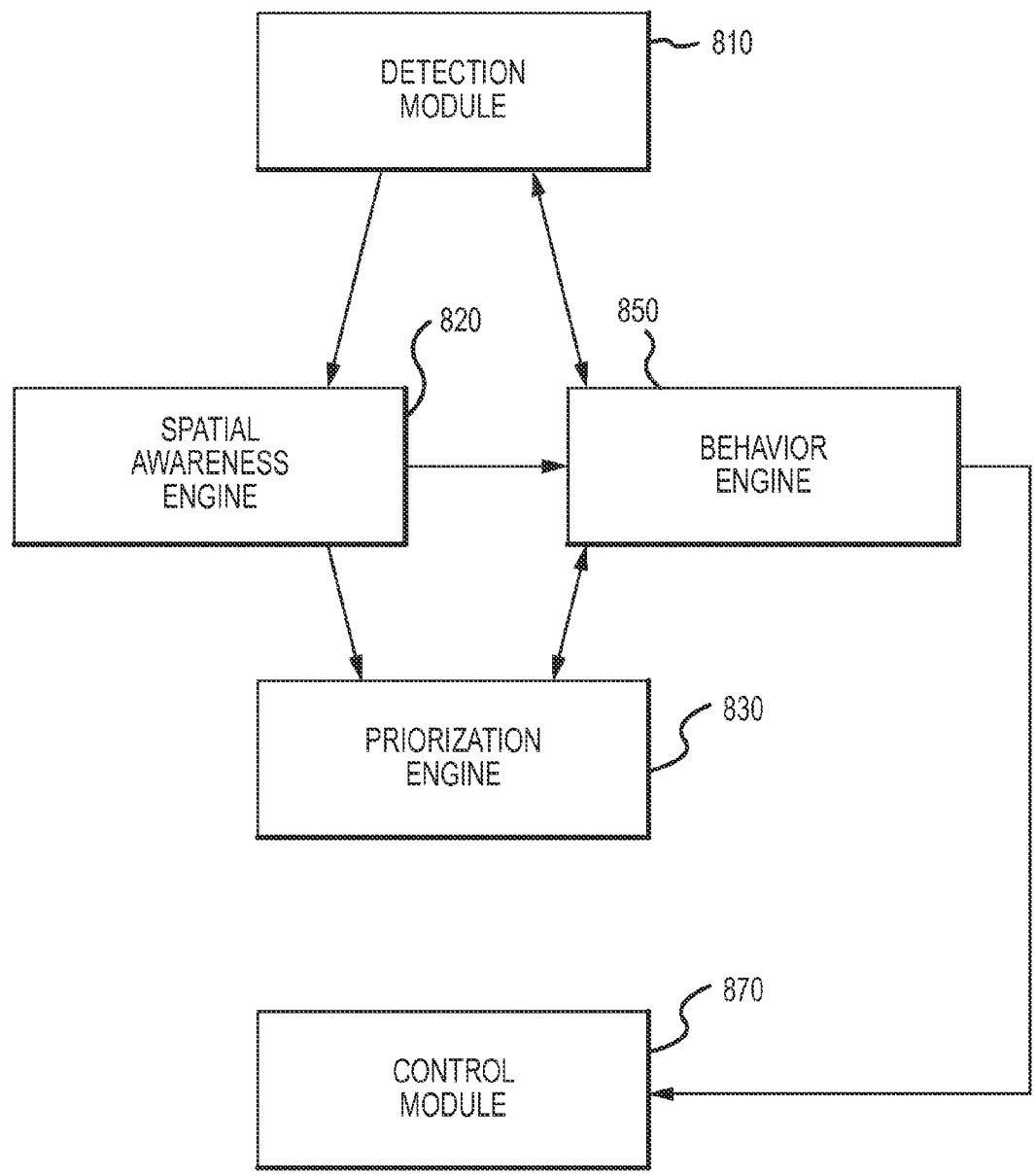
FIG. 8 is a high level block diagram of a system for distributed positioning and collaborative behavioral determination according to one embodiment of the present invention.

FIG. 8 presents a high level block diagram of a system for distributed positioning and collaborative behavioral determination according to one embodiment of the present invention. According to one embodiment of the present invention, one or more objects can each possess a detection module 810 that is communicatively coupled to a spatial awareness engine 820 and a behavior engine 850. The detection module is operable to sense the presence of one or more nearby objects and to ascertain from those objects not only a relational position (range and bearing) of the object but certain state information. That information can include the relative motion of the object (speed and direct) as well as capabilities of the object, object physical attributes, mission parameters, and the like. The detection module can also gain spatial information from the object and use that information to not only establish that object's relative location, but also to enhance the requesting object's own spatial data. The detection of an object and determination of relational data can be obtained, in one embodiment, by Ultra Wide Band tags (also referred to herein as RFID tags). The interaction and integration of these tags can be used to communicate informational data among various objects.

The information gained by the detection engine is conveyed, in one embodiment, to a spatial awareness engine 820. The spatial awareness engine 820 develops a relational representation of the environment in which the object operates. In one embodiment, the spatial representation is object centric providing the object with continual information about objects in its immediate vicinity. Each object produces and maintains its own spatial representation or map as well as its own positioning scheme. While not necessary to merge the representations between various objects to a common map, the representation can contain common artifacts or fiducial markers that assist in correlating the maps and the position of each object. For example, the location of a fixed reference point can be represented in maps of several objects and then used by each as a common point of reference. These fixed reference points can be positioned in lighting appliances, signs near an entrance or exit, emergency devices such as smoke detectors and emergency lights, alarm systems, motion detectors, fire extinguishers, and the like.

Both the spatial awareness engine 820 and the detection module 810 convey data and are communicatively coupled to the behavior engine 850. The behavior engine 850 and the spatial awareness engine 820 are also communicatively coupled to the prioritization engine 830. The prioritization engine 830 assesses the relative position and state of each detected nearby object along with behavior attributes of the host object to prioritize positional and mission specific (state) data. For example, the prioritization engine can determine based on the spatial representation that one of the nearby objects, as opposed to another, will conflict with the current path of the host object. In another embodiment, the prioritization engine 830 can assess and provide a ranking of mission objectives of other nearby objects based both on received state information and their relative location.

The behavior engine 850 can use such information to coordinate actions of the host and/or nearby objects to achieve common tasking. The behavior engine can further selectively coordinate activities among the nearby objects based on the known mission objectives. For example, the prioritization engine may determine that of the four nearby objects, the mission of one object should take precedence over that of the host object. It may also, however, indicate that another object is rapidly approaching and for self-preservation, the host object should take a certain action. Thus, the prioritization engine, in conjunction with the behavior engine, continually evaluates the spatial environment and mission objectives of the host and nearby objects.

The behavior engine 850 is further coupled to a control module 870 that initiates commands to the host object resulting in various actions. These commands and actions are also conveyed to the detection module so as to be conveyed, when appropriate, to other objects.

Figure 9:
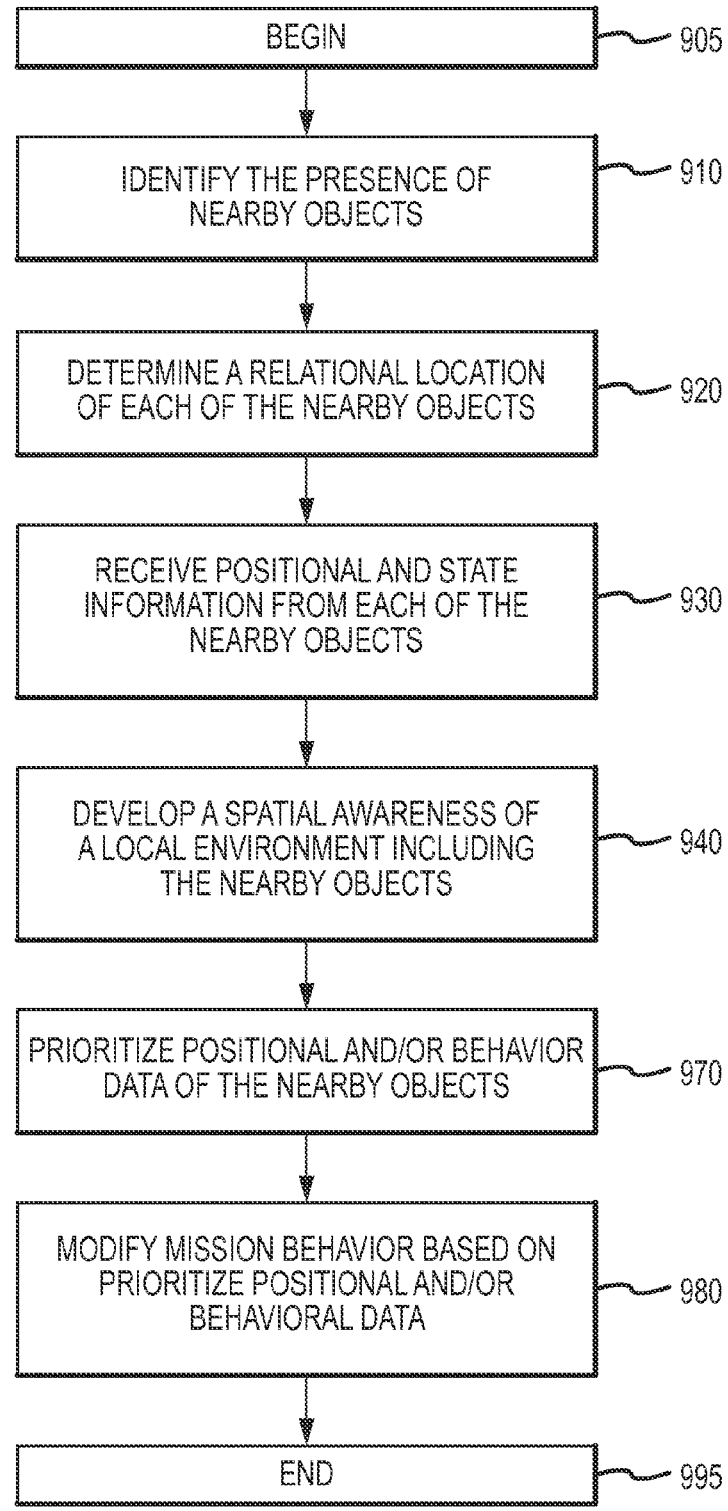
FIG. 9 is a flowchart for one method embodiment for distributed positioning and collaborative behavioral determination according to the present invention.

FIG. 9 is a flowchart for one method embodiment for distributed positioning and collaborative behavioral determination according to the present invention. Such a process begins 905 with identifying 910 the presence of nearby objects. Using various techniques as described herein and known to one of reasonable skill in the relevant art, each object senses the presence and relative position of nearby objects. Using this data a relational location of each nearby object is developed 920. In addition, spatial positional and state information is received 930 from the nearby objects. For example, a host may determine that an object exists bearing 120 degrees relative at 10 meters. That object may thereafter convey to the host object its precise spatial location and motion. Based on this, the host may be able to update its spatial location and determine if their paths are about to cross and conflict.

A spatial awareness of the local environment is thus developed 940 that can include common references as well as a plurality of nearby objects. Positional and/or behavioral (state) information is prioritized based, in one embodiment, on predefined parameters. This prioritized data, along with existing mission objectives and spatial awareness, can assist the behavior engine to modify 980 an objects' behavior. These modifications can be based on a wide variety of criteria, such as self preservation to mission essential services. While the modification of an objects' behavior arguably completes 995 the behavior determination, one skilled in the relevant art will recognize that the processes described herein are continual and integrated among each of the plurality of objects.

For example, using this approach a number of objects can each possess the objective to follow a lead object, and at the same time, maintain a certain distance from each other object. As the lead object maneuvers, each of the following objects react but, at the same time, maintain their following behavior. In this way objects employing one or more embodiments of the present invention can exhibit behavior akin to a flock of birds or school of fish. For example, see and avoid behavior of aircraft or formation flights.

Another aspect of the present invention is the ability to use devices capable of generating a range determinative signal to specify a route of travel. Such devices or tags can be used to specify locations to which an object can navigate. As previously described, the present invention enables an object to determine its spatial position with respect to other nearby objects and/or its environment. In situations in which an object is a fixed location with known positional data, that object or tag can be used as a common reference point for a plurality of mobile objects by which to form a common frame of reference. Similarly, a number of tags can be positioned or placed in fixed locations on or along a desired route of travel.

Using these fixed locations, an object which can determine its relative position with respect to these locations can create one or more virtual waypoints representing a desired route. Alternatively, an object can simply proceed from one tag to another along the route. In the scenario in which the object uses the data transmitted from devices at fixed locations to create an separate route, such a route can be modified in response to newly gained information regarding potential hazards or conflicts along the route. In a same manner, the object can record its route of travel based on the nearby location of the fixed devices should it have to retrace its steps.

Consider for example a mechanical device designed to deliver hazardous material across a threatening or hostile environment. For instance, the delivery of ordinance to a military unit across a region suspected to possess land mines. The environment itself prevents the placement of tags (ranging devices) precisely along the route of travel. Thus tags are placed in the vicinity of the region but within the hostile environment itself. The object delivering the ordnance can within a certain distance detect hazards (in this case a land mine), but global detection and identification of these hazards is either impossible or impractical. Using the concepts of the present invention, the device develops a spatial awareness of the environment including its relative location with respect to the other fixed transmitters and other known hazards or obstacles. For example, land features may exist that prevent traversal of a specific portion of the environment. The desired destination is also known.

Using its spatial understanding, the object can develop a path by which to arrive at the destination using virtual waypoints. As the device moves forward, it may identify a hazard within its projected course. According to one embodiment of the present invention, the object can modify its course of action to circumvent the hazard. At the same time, the location of the hazard can be recorded and conveyed to other nearby objects. Once a path has been found, the system of the present invention can replicate the path precisely and can communicate the path to other objects within the local network. Such an approach can be enhanced with other positional data tools such as GPS, laser range finding, and the like, however, at a local scale the present invention can independently determine a local spatial awareness and use that information to achieve a mission objective. In essence, the present invention enables an object to independently determine its location relative to other nearby objects using active ranging technology. In this case, the fixed tags provide a constellation of range data by which the object can continually determine its position.

Upon reading this disclosure, those of skill in the art will appreciate still additional alternative structural and functional designs for a system and a process for collaborative spatial positioning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

An implementation of the present invention may also be executed in a Web environment, where software installation packages are downloaded using a protocol such as the HyperText Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. Furthermore, it may happen that the client and server of a particular installation both reside in the same physical device, in which case a network connection is not required. (Thus, a potential target system being interrogated may be the local device on which an implementation of the present invention is implemented.)

While there have been described above the principles of the present invention in conjunction with a technique for collaborative spatial positioning, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for distributed positioning and collaborative behavior determination by an object employed a system for collaborative spatial positioning, comprising:

identifying, by said system, a presence of one or more nearby objects based on at least one ultra wide band (UWB) tag associated with each of the one or more nearby objects, wherein each of the one or more nearby objects includes at least one ultra wide band transmitter and wherein the object is associated with two or more ultra wide band transceivers;

receiving, by said system, by each of the two or more ultra wide band transceivers associated with the object, positional determinative resources and state information from each of the one or more nearby objects wherein said state information includes object identification information, behavioral information and mission objectives of the one or more nearby objects and wherein the positional determinative resources information comprises information of a range localization and one or more of inertial systems, a global positioning system (GPS), and a path integration;

determining, by said system, a relational location of each of the one or more nearby objects by analyzing differences between the received positional determinative resources and state information at each of the two or more ultra wide band transceivers associated with the object;

developing, by said system, a spatial awareness of a local environment based on the relational location of the one or more nearby objects to identify potential collisions between the object and the one or more nearby objects;

prioritizing, by said system, the state information from each of the one or more nearby objects based on at least a mission objective of the object and the mission objectives of the one or more nearby objects;

prioritizing, by said system, the received positional determinative resources information from each of the one or more nearby objects based on perceived accuracy and historical variance of positional information provided by each resource of the positional determinative resources information;

modifying, by said system, mission behavior of the object based on the spatial awareness of the local environment, the prioritized positional determinative resources from each of the one or more nearby objects, the prioritized state information from each of the one or more nearby objects, and the potential collisions between the object and the one or more nearby objects; and coordinating, by said system, mission behavior prioritization of the object and each of the one or more nearby objects to achieve a common tasking based on said modifying.

2. The method for distributed positioning and collaborative behavior determination by the object according to claim 1 wherein modifying said mission behavior includes modifying a drive control of the object to prevent a collision with the one or more nearby objects.

3. The method for distributed positioning and collaborative behavior determination by the object according to claim 1, wherein the relational location includes range and bearing information from the object to each of the one or more nearby objects.

4. The method for distributed positioning and collaborative behavior determination by the object according to claim 1, wherein modifying said mission behavior includes generating an escalating alert about the potential collisions.

5. The method for distributed positioning and collaborative behavior determination by the object according to claim 1, wherein orientation of the two or more ultra wide band transceivers associated with the object are self calibrating.

6. The method for distributed positioning and collaborative behavior determination by the object according to claim 1, wherein the object determines range and bearing information to each of the one or more nearby objects based solely on range information received by the two or more ultra wide band transceivers associated with the object.

7. The method for distributed positioning and collaborative behavior determination by the object according to claim 1, wherein the local environment includes a common reference point.

8. The method for distributed positioning and collaborative behavior determination by the object according to claim 1, wherein the spatial awareness of the one or more nearby objects is developed independently by the object.

9. The method for distributed positioning and collaborative behavior determination by the object according to claim 1, wherein prioritizing the state information is based on pre-established mission behavior logic.

10. The method for distributed positioning and collaborative behavior determination by the object according to claim 1, wherein coordinating the mission behavior prioritization includes synchronizing mission behavior between the object and the one or more nearby objects.

11. The method for distributed positioning and collaborative behavior determination by an object according to claim 1, wherein coordinating the mission behavior prioritization includes physical contact between two or more objects.

12. A collaborative spatial positioning system employed by an object for distributed positioning and collaborative behavior determination by the object, the system comprising:

a ranging device, wherein the ranging device identifies a presence of one or more nearby objects based on at least one ultra wide band (UWB) tag associated with each of the one or more nearby objects;

wherein the ranging device detects a plurality of signals from the one or more nearby objects, each signal is transmitted by an UWB tag associated with each of the one or more nearby objects, and wherein each signal includes positional determinative resources and state information about the one or more nearby objects, said positional determinative resources information comprising information of a range localization and one or more of inertial systems, a global positioning system (GPS), and a path integration, and said state information including object identification information, behavioral information and mission objectives;

a spatial awareness engine, wherein the spatial awareness engine creates an independent relative representation of each of the one or more nearby objects based on the positional determinative resources and state information received from the plurality of signals and identifies potential conflicts and using that the independent relative representation of each of the one or more nearby objects creates a spatial awareness of a local environment of the one or more nearby objects;

a prioritization engine, wherein the prioritization engine prioritizes the state information from each of the one or more nearby objects based on at least a mission objective of the object and the mission objectives of the one or more nearby objects and prioritizes the positional determinative resources information from each of the one or more nearby objects based on perceived accuracy and historical variance of positional information provided by each resource of the positional determinative resources information; and a behavior engine, wherein the behavior engine integrates and combines predictive behaviors to modify a mission objective of the object and coordinate activities between the object and the one or more nearby objects based on the spatial awareness of the local environment, the prioritized positional determinative resources information from each of the one or more nearby objects, the prioritized state information from each of the one or more nearby objects, and the potential conflicts between the object and the one or more nearby objects.

13. The system for distributed positioning and collaborative behavior determination by the object according to claim 12, wherein the spatial awareness engine uses ranging information from each Ultra Wide Area Band (UWB) tag to determine relative position of each of the one or more nearby objects.

14. The system for distributed positioning and collaborative behavior determination by the object according to claim 12, wherein relational information includes range, bearing and relative velocity information for each of the one or more nearby objects.

15. The system for distributed positioning and collaborative behavior determination by the object according to claim 12, wherein the ranging device receives each signal at two or more receivers associated with the object.

16. The system for distributed positioning and collaborative behavior determination by the object according to claim 12, wherein the independent spatial representation is object centric.

17. The system for distributed positioning and collaborative behavior determination by the object according to claim 12, wherein the independent spatial representation includes a common frame of reference.

18. The system for distributed positioning and collaborative behavior determination by the object according to claim 12, wherein the behavior engine generates an escalating alert based on the potential conflicts.

19. A collaborative spatial positioning system employed by an object for distributed positioning and collaborative behavior determination by the object, the system comprising:

a detection module operable to receive a signal from each of one or more nearby objects to identify a presence of the one or more nearby objects, wherein each signal is generated by an ultra wide band (UWB) transmitter, wherein each signal includes positional determinative resources and state information about the one or more nearby objects, said positional determinative resources information comprises information of a range localization and one or more of inertial systems, a global positioning system (GPS), and a path integration, and said state information including object identification information, behavioral information and mission objectives;

a spatial awareness engine operable to create a relative representation of each of the one or more nearby objects from each received signal from each of one or more nearby objects and identify potential conflicts and using that the relative representation of each of the one or more nearby objects to create a spatial awareness of a local environment of the one or more nearby objects wherein the relative representation is object centric and provides translational information about each of the one or more nearby objects;

a prioritization engine operable to prioritize the state information from each of the one or more nearby objects based on at least a mission objective of the object and the mission objectives of the one or more nearby objects and prioritize the positional determinative resources information from each of the one or more nearby objects based on perceived accuracy and historical variance of positional information provided by each resource of the positional determinative resources information; and a behavior engine operable to modify one or more mission objectives of the object by integrating and combining predictive behaviors based on the spatial awareness of the local environment, the prioritized positional determinative resources information from each of the one or more nearby objects, the prioritized state information from each of the one or more nearby objects, and the potential conflicts between the object and the one or more nearby objects to coordinate activities between the object and the one or more nearby objects.

20. The system for distributed positioning and collaborative behavior determination by the object according to claim 19, wherein the detection module receives each signal at two or more receivers.

* * * * *